(12) United States Patent
Sawyers-Abbott et al.

(10) Patent No.: US 11,448,128 B2
(45) Date of Patent: Sep. 20, 2022

(54) FLUID ADDITIVE SYSTEM

(71) Applicant: United Technologies Corporation, Farmington, CT (US)

(72) Inventors: Nigel David Sawyers-Abbott, South Glastonbury, CT (US); Kenneth N. Baker, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 328 days.

(21) Appl. No.: 16/785,853

(22) Filed: Feb. 10, 2020

(65) Prior Publication Data

US 2021/0246828 A1 Aug. 12, 2021

(51) Int. Cl.
*F02C 7/06* (2006.01)
*F01D 25/20* (2006.01)

(52) U.S. Cl.
CPC ............... *F02C 7/06* (2013.01); *F01D 25/20* (2013.01); *F05D 2260/98* (2013.01)

(58) Field of Classification Search
CPC .......... F02C 7/06; F02M 11/10; F01D 25/20; F01M 9/02; F05D 2260/98
USPC ........................................................ 184/6.11
See application file for complete search history.

(56) References Cited

U.S. PATENT DOCUMENTS

| 5,067,455 | A | * | 11/1991 | Okajima | F01M 9/02 |
| | | | | | 123/196 R |
| 6,845,745 | B2 | * | 1/2005 | Carey | F01M 9/02 |
| | | | | | 123/196 R |
| 7,174,997 | B2 | * | 2/2007 | Sheridan | F16N 29/00 |
| | | | | | 184/6.26 |
| 9,458,923 | B2 | | 10/2016 | Poster et al. | |
| 9,624,798 | B2 | * | 4/2017 | Mullen | B64C 27/14 |
| 10,150,932 | B2 | * | 12/2018 | Opalka | C10M 125/22 |
| 2003/0000773 | A1 | * | 1/2003 | Engler | B05B 17/04 |
| | | | | | 184/6.26 |
| 2003/0183188 | A1 | | 10/2003 | Carey et al. | |
| 2004/0079589 | A1 | * | 4/2004 | Schneider | F01M 9/02 |
| | | | | | 184/1.5 |
| 2007/0261922 | A1 | * | 11/2007 | Mullen | F16N 39/00 |
| | | | | | 184/6.12 |
| 2009/0082236 | A1 | | 3/2009 | Wen et al. | |
| 2011/0041796 | A1 | * | 2/2011 | Sachdev | B01D 35/143 |
| | | | | | 123/196 A |

(Continued)

FOREIGN PATENT DOCUMENTS

WO 2017/031327 A1 2/2017

OTHER PUBLICATIONS

European Search Report for EP Application No. 21 156240 dated Jun. 22, 2021.

*Primary Examiner* — Michael R Mansen
*Assistant Examiner* — Mark K Buse
(74) *Attorney, Agent, or Firm* — Carlson, Gaskey & Olds, P.C.

(57) ABSTRACT

A lubrication system for a gas turbine engine includes a primary fluid tank to receive a primary fluid, at least one secondary fluid tank to receive at least one fluid additive, and a mixer. The mixer has at least a first inlet in fluid communication with the primary fluid tank and a second inlet in fluid communication with the at least one secondary fluid tank. The mixer has at least one outlet that delivers a mixture of the primary fluid and the at least one fluid additive to a gas turbine engine component.

24 Claims, 2 Drawing Sheets

(56) References Cited

U.S. PATENT DOCUMENTS

2014/0314569 A1 10/2014 Michaud et al.
2017/0175875 A1* 6/2017 Lapeyre ............... F16H 57/045

* cited by examiner

FLUID ADDITIVE SYSTEM

BACKGROUND

This disclosure relates to a gas turbine engine with a fluid additive system.

Gas turbine engines are known and typically include a fan delivering air into a bypass duct as bypass air and into a compressor as core air. The air is compressed and delivered into a combustor section where the air is mixed with fuel and ignited. Products of the combustion pass downstream over turbine rotors, which causes the turbine rotors to rotate. Components in gas turbine engines are subjected to increasing loads and temperatures. Lubrication systems are used to increase thermal stability and improve performance.

SUMMARY

In a featured embodiment, a lubrication system for a gas turbine engine includes a primary fluid tank to receive a primary fluid, at least one secondary fluid tank to receive at least one fluid additive, and a mixer. The mixer has at least a first inlet in fluid communication with the primary fluid tank and a second inlet in fluid communication with the at least one secondary fluid tank. The mixer has at least one outlet that delivers a mixture of the primary fluid and the at least one fluid additive to a gas turbine engine component.

In another embodiment according to the previous embodiment, the mixer comprises a pump or venturi mixer.

In another embodiment according to any of the previous embodiments, a control system is configured to control an amount of the at least one fluid additive to be added to the primary fluid in the mixer.

In another embodiment according to any of the previous embodiments, the at least one fluid additive is continuously supplied to the mixer during operation of the gas turbine engine.

In another embodiment according to any of the previous embodiments, the amount of the at least one fluid additive to be added to the primary fluid in the mixer increases over time to accommodate component wear.

In another embodiment according to any of the previous embodiments, the amount of the at least one fluid additive to be added to the primary fluid in the mixer increases in response to at least one predetermined condition.

In another embodiment according to any of the previous embodiments, the at least one predetermined condition includes one or more of the following: ambient temperature above a predetermined temperature, ambient temperature below a predetermined temperature, increased engine speed condition, increased engine load condition.

In another embodiment according to any of the previous embodiments, the at least one secondary fluid tank comprises a plurality of secondary fluid tanks, wherein each secondary fluid tank includes a different fluid additive.

In another embodiment according to any of the previous embodiments, a control system is configured to control an amount of each fluid additive to be added to the primary fluid in the mixer.

In another embodiment according to any of the previous embodiments, the mixer includes an additional fluid inlet for each additional secondary fluid tank.

In another embodiment according to any of the previous embodiments, the plurality of secondary fluid tanks includes at least a first secondary fluid tank to receive a first fluid additive and a second secondary fluid tank to receive a second fluid additive, and wherein the first fluid additive is utilized for a first predetermined condition and the second fluid additive is utilized for a second predetermined condition that is different than the first predetermined condition.

In another embodiment according to any of the previous embodiments, at least one fluid additive is continuously supplied to the mixer during operation of the gas turbine engine.

In another embodiment according to any of the previous embodiments, at least one additional fluid additive is selectively supplied to the mixer in response to a predetermined condition.

In another exemplary embodiment, a method comprises: providing a primary fluid tank to receive a primary fluid, at least one secondary fluid tank to receive at least one fluid additive, and a mixer having at least a first inlet in fluid communication with the primary fluid tank and a second inlet in fluid communication with the at least one secondary fluid tank; and mixing the primary fluid and the at least one fluid additive in the mixer and delivering a mixture of the primary fluid and the at least one fluid additive to a gas turbine engine component via at least one mixer outlet.

In another embodiment according to any of the previous embodiments, the method includes controlling an amount of the at least one fluid additive to be added to the primary fluid in the mixer.

In another embodiment according to any of the previous embodiments, the method includes continuously supplying the at least one additive to the mixer during operation of the gas turbine engine, and/or increasing the amount of the at least one fluid additive to be added to the primary fluid over time to accommodate component wear.

In another embodiment according to any of the previous embodiments, the at least one secondary fluid tank comprises a plurality of secondary fluid tanks, wherein each secondary fluid tank includes a different fluid additive, and including controlling an amount of each fluid additive to be added to the primary fluid in the mixer.

In another embodiment according to any of the previous embodiments, the plurality of secondary fluid tanks includes at least a first secondary fluid tank to receive a first fluid additive and a second secondary fluid tank to receive a second fluid additive, and including utilizing the first fluid additive for a first predetermined condition and utilizing the second fluid additive for a second predetermined condition that is different than the first predetermined condition.

In another embodiment according to any of the previous embodiments, the method includes continuously supplying at least one fluid additive to the mixer during operation of the gas turbine engine and selectively supplying at least one additional fluid additive to the mixer in response to a predetermined condition.

In another embodiment according to any of the previous embodiments, the method includes increasing an amount of at least one fluid additive in response to at least one predetermined condition, wherein the at least one predetermined condition includes one or more of the following: ambient temperature above a predetermined temperature, ambient temperature below a predetermined temperature, increased engine speed condition, increased engine load condition These and other features may be best understood from the following drawings and specification.

DETAILED DESCRIPTION

Figure 1:
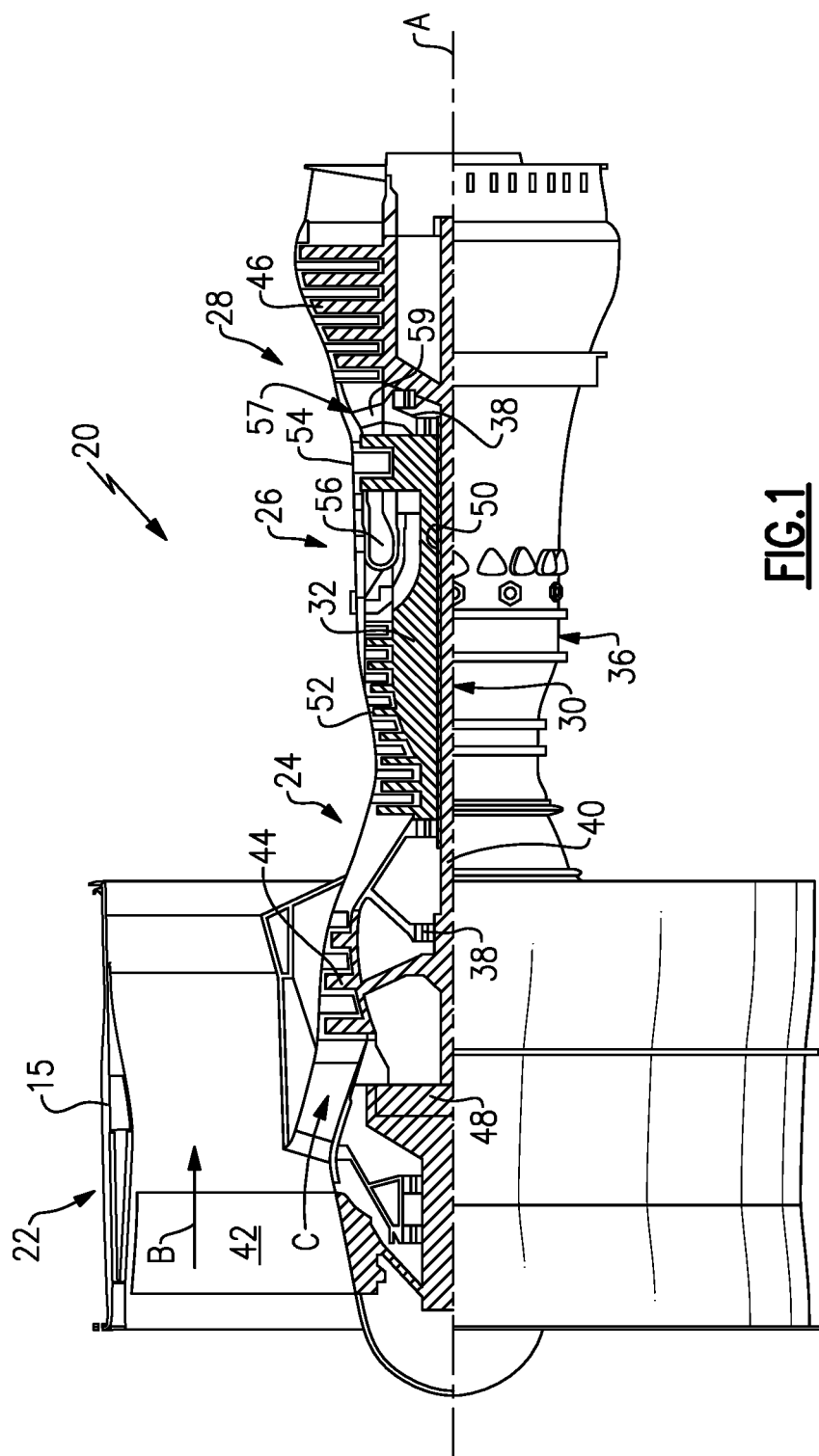
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
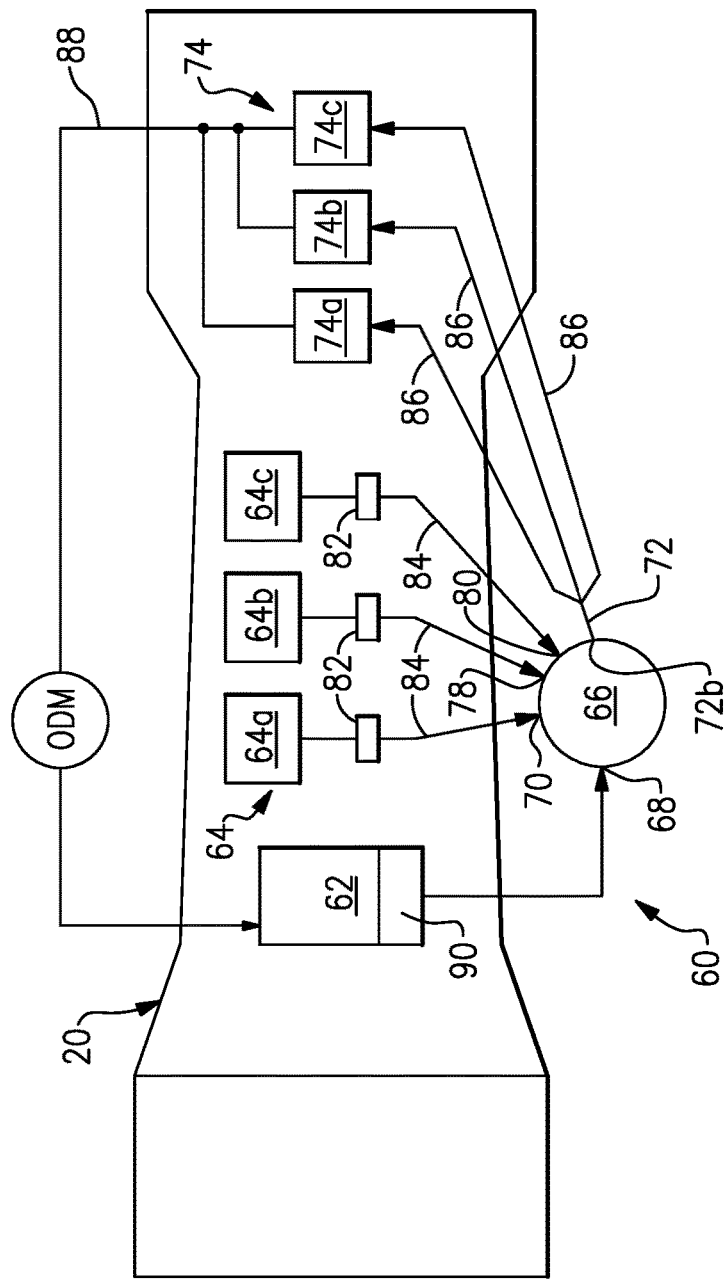
FIG. 2 is a schematic side view of a lubrication system mounted to a gas turbine engine.

FIG. 2 shows an example of a lubrication system 60 for a gas turbine engine. Increasing gas turbine engine efficiency trends are driving higher loads and temperatures in the lubrication system. It is challenging to address these higher loads and temperatures with traditional lubrications. In some cases, it is important to provide a lubricant that has a high thermal stability, will not burn, and provide high load capacity. In other cases, it may be of prime importance to withstand extremes of high and low temperature operation. In either case, it is not desirable to swap oils, nor provide highly specialized oils to a fleet, but provide a supplementary capability to a standard oil on an as-needed basis. The subject disclosure provides a lubrication system 60 that selectively mixes one or more separate additive fluids with a main supply of lubricant. Such a system will save weight, reduce cost, and reduce complexity of the gas turbine engine and enable tuning of field operations without broad-scale changes in lubricant supply chain.

In one example, the lubrication system 60 includes a primary fluid tank 62, which receives a primary fluid or primary lubricant, such as oil for example, and at least one secondary fluid tank 64 that receives at least one fluid additive. A mixer 66 has at least a first inlet 68 in fluid communication with the primary fluid tank 62 and a second inlet 70 in fluid communication with the secondary fluid tank 64. The mixer 66 has at least one outlet 72 that delivers a mixture of the primary fluid and the fluid additive to a gas turbine engine component or system 74. The mixer 66 can use a single outlet 72 or could also include additional outlets that direct the mixture to additional systems (74a, 74b, 74c, etc.). The systems 74 can comprise bearing compartments, gear systems, etc., for example.

Figure 3:
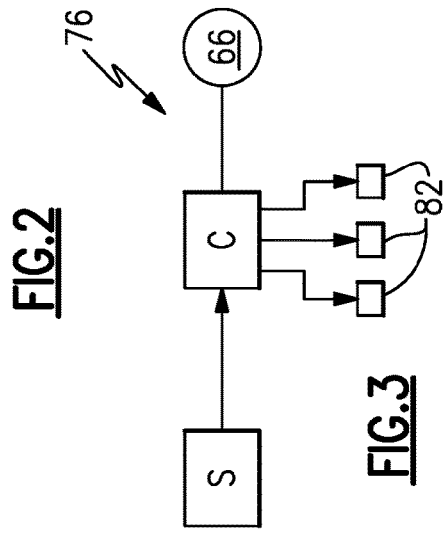
FIG. 3 is a schematic view of a control system for the lubrication system of FIG. 2.

As shown in FIG. 3, any type of mixer 66 can be used to mix the primary lubricant and additive. For example, the mixer could comprise a pump or venturi mixer. A control system 76 is configured to control an amount of the fluid additive to be added to the primary fluid in the mixer 66. Optionally, the control system 76 can also control operation of the mixer itself if necessary. The control system 76 can be a separate system with a dedicated electronic control unit/controller C or the control system 76 can utilize an existing engine controller that is used for one or more other gas turbine engine systems.

The controller C of the control system 76 can include a processor, memory, and one or more input and/or output (I/O) device interface(s) that are communicatively coupled via a local interface. The local interface can include, for example but not limited to, one or more buses and/or other wired or wireless connections. The controller C may be a hardware device for executing software, particularly software stored in memory. The software in the memory may include one or more separate programs, each of which includes an ordered listing of executable instructions for implementing logical functions. The controller C can be configured to execute the software stored within the memory, to communicate data to and from the memory, and to generally control operations of the computing device pursuant to the software. Software in memory, in whole or in part, is read by the processor, perhaps buffered within the processor, and then executed. The controller C is configured to control the lubrication system 60 such that desired amounts of additives are blended into the main oil or lubricant supply as needed to address component wear and/or certain predetermined conditions.

In one example, the controller C provides that the fluid additive is continuously supplied to the mixer 66 during operation of the gas turbine engine 20. In an initial cycle, the amount of additive added to the main supply would be relatively low, but the amount or concentration of the additive can be increased progressively over time to address component wear or reduction of lubricant life. If the primary fluid tank 62 is re-supplied with new lubricant, or if components are repaired/replaced, the amount of additive can be returned to the initial lower concentration and then subsequently increased again over time.

In another example, the controller C provides that one or more fluid additives are selectively supplied to the mixer 66 during operation of the gas turbine engine 20. In one example, the amount of fluid additive that is added to the primary fluid in the mixer 66 increases in response to at least one predetermined condition. Examples of predetermined conditions include one or more of the following: ambient temperature above a predetermined temperature, ambient temperature below a predetermined temperature, increased engine speed condition, increased engine load condition, predetermined engine cycle number, predetermined hours of engine operation. Sensors S can be used to provide temperature, speed, fluid flow rate, etc. information to the controller C. The sensors S may also include an oil debris monitoring system ODM and an oil sensor 90 (FIG. 2) that can monitor a predetermined oil parameter or characteristic, for example, and this information can be communicated to the control system 76 as needed.

In one example, during high ambient temperatures an increased amount of additive may be mixed with the primary lubricant. In another example, an increased amount of additive can be used under high engine speed conditions and/or high engine load conditions such as take-off.

In one example, the at least one secondary fluid tank 64 comprises a plurality of secondary fluid tanks (64a, 64b, 64c) where each secondary fluid tank (64, 64b, 64c) includes a fluid additive that is different from the fluid additives in the other secondary fluid tanks. The controller C is configured to control an amount of each fluid additive to be added to the primary fluid/lubricant in the mixer 66.

In one example, the mixer 66 includes an additional fluid inlet for each additional secondary fluid tank (64a, 64b, 64c). For example, the first inlet 70 is in fluid communication with the one secondary fluid tank 64a, a second inlet 78 is in fluid communication with another secondary fluid tank 64b, and a third inlet 80 is in fluid communication with a third secondary fluid tank 64c. In this example, the first secondary fluid tank 64a receives a first fluid additive, the second secondary fluid tank 64b receives a second fluid additive, and the third secondary fluid tank 64c receives a third fluid additive. The first fluid additive is utilized for a first predetermined condition, the second fluid additive is utilized for a second predetermined condition that is different than the first predetermined condition, and the third fluid additive is utilized for a third predetermined condition that is different than the first and second predetermined conditions. Each of these predetermined conditions can comprise any of the conditions as discussed above.

For example, during high ambient temperatures a first type of additive may be mixed with the primary lubricant. In another example, a second type of additive can be used for high engine speed conditions and/or high engine load conditions such as take-off, for example. In another example, a third type of additive can be used for cold ambient temperature conditions, such as below freezing for example. In another example, lubricant degradation may be tracked and trended in relation to cycle number or operating hours so that additive concentrate is mixed to replenish the lubricant.

In one example, one or more valves 82 are associated with supply lines 84 that connect each secondary fluid tank (64a, 64b, 64c) to the mixer 66. The controller C controls the valves to determine when and how much additive is to be added in response to the identified predetermined condition. In one example, the valves 82 can comprise separate components. In another example, the valves 82 can be incorporated into the mixer 66.

In one example, one or more of the fluid additives can be continuously supplied to the mixer 66 during operation of the gas turbine engine. In another example, one or more of the fluid additives are selectively supplied to the mixer 66 during operation of the gas turbine engine. In another example, one or more of the fluid additives can be continuously supplied to the mixer 66 during operation of the gas turbine engine in combination with selectively adding one or more additional additives.

The mixtures of the primary lubrication fluid and additives are then supplied to downstream gas turbine engine components or systems 74 via additional supply lines 86. The fluid can then be returned to the main fluid supply 62 via return lines 88 or can be fluidly communicated to a downstream system for further processing, filtering, etc. The return line 88 may include an oil debris monitor ODM that operates as known. Additional primary lubricant and additives are respectively added to the primary fluid tank 62 and secondary fluid tanks 64 during maintenance intervals over time to maintain desired supply levels.

Additives can have many purposes including providing higher load carrying capability for rotating components such as gears, bearings etc. The additives can also be used to provide coatings for reduced friction and wear, to provide higher thermal stability of the lubricant for hot climate operations, and to reduce acidity of older lubricant. Further, the additives can be used for removal of varnishing/coking on components, and the additives can replenish any spent additives to extend engine servicing intervals.

Any type of additive can be used for each of the secondary fluid tanks (64a, 64b, 64c). In one example, additives are used that have a high performance in areas such as reduced friction, reduced heat generation, film forming capability, etc. In one example, the additives include anti-wear and extreme pressure compositions that can be easily blended in the mixer 66 with the primary lubricant. In one example, phosphates are used as additives. In another example, the additive fluids include nanoparticles. U.S. Pat. No. 10,150,932, which is assigned to the assignee of the subject application, includes examples of such fluids and is herein incorporated by reference.

The lubrication system 60 includes a primary lubrication supply system that uses traditional lubrication fluid in combination with a parallel system that provides controlled mixing of one or more additives to the primary engine lubrication system. The mixer 66 is used to provide the controlled mixing of the additives with the primary lubricant to ensure adequate blending. This is beneficial for fleets as the secondary system can be easily added on to existing systems as needed.

The blended mixture of primary fluid and additives provides for a system lubricant with improved thermal stability and temperature capability, which results in weight and cost savings and extended maintenance intervals. Engine complexity can also be reduced as additional components such as heat exchangers, heat shielding, and insulation will be reduced or eliminated. Further, with improved additives, superior film strength is provided to reduce wear with less fluid, resulting in further weight and cost savings. Additionally, the use of the additives can reduce the time between maintenance periods and can improve fuel efficiency by reducing frictional parasitic losses.

Although an embodiment has been disclosed, a worker of ordinary skill in this art would recognize that certain modifications would come within the scope of this disclosure. For that reason, the following claims should be studied to determine the true scope and content of this disclosure.

The invention claimed is:

1. A lubrication system for a gas turbine engine comprising:
   a primary fluid tank to receive a primary fluid;
   at least one secondary fluid tank to receive at least one fluid additive; and
   a mixer having at least a first inlet in fluid communication with the primary fluid tank and a second inlet in fluid communication with the at least one secondary fluid tank, and including at least one outlet that delivers a mixture of the primary fluid and the at least one fluid additive to a gas turbine engine compartment, and wherein the mixture of the primary fluid and the at least one fluid additive is directly fed from the at least one mixer outlet into an inlet to the gas turbine engine component.

2. The lubrication system according to claim 1, wherein the mixer comprises a pump or venturi mixer.

3. The lubrication system according to claim 1, including a control system configured to control an amount of the at least one fluid additive to be added to the primary fluid in the mixer.

4. The lubrication system according to claim 3, wherein the at least one fluid additive is continuously supplied to the mixer during operation of the gas turbine engine.

5. The lubrication system according to claim 3, wherein the amount of the at least one fluid additive to be added to the primary fluid in the mixer increases over time to accommodate component wear.

6. The lubrication system according to claim 3, wherein the amount of the at least one fluid additive to be added to the primary fluid in the mixer increases in response to at least one predetermined condition.

7. The lubrication system according to claim 6, wherein the at least one predetermined condition includes one or more of the following: ambient temperature above a predetermined temperature, ambient temperature below a predetermined temperature, increased engine speed condition, increased engine load condition.

8. The lubrication system according to claim 1, wherein the at least one secondary fluid tank comprises a plurality of secondary fluid tanks, wherein each secondary fluid tank includes a different fluid additive.

9. The lubrication system according to claim 8, including a control system configured to control an amount of each fluid additive to be added to the primary fluid in the mixer.

10. The lubrication system according to claim 9, wherein the mixer includes an additional fluid inlet for each additional secondary fluid tank.

11. The lubrication system according to claim 9, wherein the plurality of secondary fluid tanks includes at least a first secondary fluid tank to receive a first fluid additive and a second secondary fluid tank to receive a second fluid additive, and wherein the first fluid additive is utilized for a first predetermined condition and the second fluid additive is utilized for a second predetermined condition that is different than the first predetermined condition.

12. The lubrication system according to claim 8, wherein at least one fluid additive is continuously supplied to the mixer during operation of the gas turbine engine.

13. The lubrication system according to claim 12, wherein at least one additional fluid additive is selectively supplied to the mixer in response to a predetermined condition.

14. The lubrication system according to claim 1, wherein the mixer is upstream and separate from the gas turbine engine component.

15. The lubrication system according to claim 1, including a supply line between the at least one mixer outlet and the inlet to the gas turbine engine component and a separate return line between an outlet from the gas turbine engine component to a return inlet into the primary fluid tank.

16. A method comprising:
   providing a primary fluid tank to receive a primary fluid, at least one secondary fluid tank to receive at least one fluid additive, and a mixer having at least a first inlet in fluid communication with the primary fluid tank and a second inlet in fluid communication with the at least one secondary fluid tank;
   mixing the primary fluid and the at least one fluid additive in the mixer and delivering a mixture of the primary fluid and the at least one fluid additive to a gas turbine engine component via at least one mixer outlet; and directly feeding the mixture of the primary fluid and the at least one fluid additive from the at least one mixer outlet into an inlet to the gas turbine engine component.

17. The method according to claim 16, including controlling an amount of the at least one fluid additive to be added to the primary fluid in the mixer.

18. The method according to claim 17, including continuously supplying the at least one additive to the mixer during operation of the gas turbine engine, and/or increasing the amount of the at least one fluid additive to be added to the primary fluid over time to accommodate component wear.

19. The method according to claim 16, wherein the at least one secondary fluid tank comprises a plurality of secondary fluid tanks, wherein each secondary fluid tank includes a different fluid additive, and including controlling an amount of each fluid additive to be added to the primary fluid in the mixer.

20. The method according to claim 19, wherein the plurality of secondary fluid tanks includes at least a first secondary fluid tank to receive a first fluid additive and a second secondary fluid tank to receive a second fluid additive, and including utilizing the first fluid additive for a first predetermined condition and utilizing the second fluid additive for a second predetermined condition that is different than the first predetermined condition.

21. The method according to claim 19, including continuously supplying at least one fluid additive to the mixer during operation of the gas turbine engine and selectively supplying at least one additional fluid additive to the mixer in response to a predetermined condition.

22. The method according to claim 19, including increasing an amount of at least one fluid additive in response to at least one predetermined condition, wherein the at least one predetermined condition includes one or more of the following: ambient temperature above a predetermined temperature, ambient temperature below a predetermined temperature, increased engine speed condition, increased engine load condition.

23. The method according to claim 16, wherein the mixer is upstream and separate from the gas turbine engine component.

24. The method according to claim 16, including providing a supply line between the at least one mixer outlet and the inlet to the gas turbine engine component and providing a separate return line between an outlet from the gas turbine engine component to a return inlet into the primary fluid tank, and further including providing an oil debris monitor in the return line.

* * * * *